(12) United States Patent (10) Patent No.: US 7,286,468 B2
Scudder et al. (45) Date of Patent: Oct. 23, 2007

(54) ROUTING SYSTEM AND METHOD FOR SYNCHRONIZING A ROUTING SYSTEM WITH PEERS AFTER FAILOVER

(75) Inventors: John Galen Scudder, Ann Arbor, MI (US); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 1095 days.

(21) Appl. No.: 10/293,162

(22) Filed: Nov. 12, 2002

(65) Prior Publication Data

US 2004/0090913 A1 May 13, 2004

(51) Int. Cl.
*G01R 31/08* (2006.01)

(52) U.S. Cl. ...................................... 370/219; 370/236

(58) Field of Classification Search ................ 370/236, 370/216–220

See application file for complete search history.

(56) References Cited

U.S. PATENT DOCUMENTS

| | | | | |
|---|---|---|---|---|
| 5,838,894 A | * | 11/1998 | Horst | 714/11 |
| 6,148,410 A | | 11/2000 | Baskey et al. | 714/4 |
| 6,151,315 A | * | 11/2000 | Ash et al. | 370/352 |
| 6,233,702 B1 | * | 5/2001 | Horst et al. | 714/48 |
| 6,286,048 B1 | * | 9/2001 | Moberg | 709/225 |
| 6,457,138 B1 | * | 9/2002 | Lesser et al. | 714/1 |

FOREIGN PATENT DOCUMENTS

EP 1189384 A2 3/2002

OTHER PUBLICATIONS

Rekhter, Y., et al., "A Border Gateway Protocol 4, (BGP-4)", *Network Working Group*, RFC 1771, (1995),pp. 1-46.
RFC2918—Route Refresh Capability for BGP-4; Internet NFC/STD/FYI/BCP Archives, © 2000, The Internet Society (4 pgs).
Chen, E., "Route Refresh Capability for BGP-4", *Network Working Group—Request for Comments: 2918*, Category: Standards Track,(Sep. 2000),1-4.

* cited by examiner

*Primary Examiner*—Brian Nguyen
(74) *Attorney, Agent, or Firm*—Schwegman, Lundberg & Woessner P.A.

(57) ABSTRACT

A routing system provides for transparent routing system failover by checkpointing route prefixes during normal operation by maintaining a route prefix table. After failure of a primary routing processor, routing with peer routing systems is synchronized through the use of this prefix table. The prefix table is managed by the primary routing processor and is accessible by a backup routing processor at least after failure of the primary routing processor. Upon the detection of a failure, a backup routing processor solicits routes from peer routing systems in response to the failure and generates a backup routing database from the routes received from peer routing systems. The backup routing processor also compares prefixes of routes in the backup routing database with prefixes in the prefix table, and sends route withdraw messages to the peer routing systems for routes having prefixes listed in the prefix table and not identified in the backup routing database.

35 Claims, 4 Drawing Sheets

NETWORK OF ROUTING SYSTEMS

NETWORK OF ROUTING SYSTEMS

ROUTING SYSTEM AND METHOD FOR SYNCHRONIZING A ROUTING SYSTEM WITH PEERS AFTER FAILOVER

TECHNICAL FIELD

The present invention pertains to routing systems, and in particular, failover of routing systems, and more particularly to re-synchronization with peer routing systems after failover.

BACKGROUND

Routers and routing systems provide for the routing of packets between nodes of a packet switched network. To enhance the reliability of the packet switched network, routing systems operating at nodes of the network may include redundant routing devices. For example, a routing system may include a primary or active routing processor that may ordinarily perform or manage packet forwarding, and a secondary or backup routing processor to take over from the primary routing processor upon failure. However, the switchover (i.e., failover) from a primary to a secondary routing processor is frequently a disruptive event. At the time of failover, the primary routing processor's current state should be reflected by the secondary routing processor. Many conventional routing systems use an active replication technique to provide for failures. In these systems, state information is continually saved (i.e., checkpointed) to the backup processor. With active replication, recovery from failures may be quick, but there is a large overhead in ordinary execution. Active replication uses a redundant structure consisting of two processor resources (e.g., two processors and memory). One problem with active replication is that because replication is continually performed while the system is running, the processing resources are used wastefully.

The BGP-4 (Border Gateway Protocol) routing protocol is one of the primary protocols used for Internet routing and is an incremental protocol based on the TCP transport. One version of BGP is described by the Network Working Group's Request for Comments (RFC) 1771, referred to as RFC 1771, entitled "A Border Gateway Protocol 4 (BGP-4)", edited by Y. Rekhter and T. Li, and dated March 1995, while other versions are described in subsequent updates and revisions of RFC 1771. The dynamic exchange of routing information for BGP is described in the Network Working Group's RFC 2918, entitled "Route Refresh Capability for BGP-4", by E. Chen and dated September 2000. The fact that the TCP transport protocol is itself quite complex, in combination with the complexity of the BGP protocol and the sheer data volume typically involved, has made it difficult to support a highly reliable BGP routing system using primary and backup routing processors because it is difficult to maintain TCP state and difficult to synchronize a BGP router with BGP peer routers after failover. Conventional systems either change the protocol or utilize extensive checkpointing. For example, some conventional approaches checkpoint essentially all state data (both TCP state and BGP protocol state). This extensive checkpointing consumes excessive resources of a system reducing system performance.

Thus there is a general need for an improved routing system and method of routing. Thus, there is also a need for a routing system and method that reduces the amount of checkpointing required during normal routing operations. There is also a need for routing system and method that re-synchronizes with peer routing systems after failover of a primary routing processor. There is also a need for routing system and method that supports a Border Gateway Protocol (BGP) and re-synchronizes with peer routing systems after failover of a primary routing processor without excessive checkpointing. There is also a need for routing system and method that re-synchronizes with peer routing systems after failover of a primary routing processor without requiring peer systems to update their software.

SUMMARY OF THE INVENTION

In one embodiment, the present invention provides a method of synchronizing a border gateway protocol (BGP) routing system with peer BGP routing systems after failure of a primary processor of the BGP routing system. In this embodiment, the primary processor utilizes an original routing database for performing routing and maintains a prefix table accessible to a backup routing processor listing prefixes of routes of the original routing database. The prefix table is available to the backup routing processor after a failure of the primary routing processor. The method, performed by the backup processor upon detection of a failure of the primary routing processor, comprises sending BGP route refresh messages to the BGP peer routing systems. The BGP route refresh messages request routes supported by the BGP peer routing systems. In this embodiment, the method also includes receiving routes from the BGP peer routing systems in response to the BGP route refresh messages, and generating a backup (i.e., regenerated) routing database from the routes received from the BGP peer routing systems. Prefixes of routes in the backup routing database are compared with prefixes in the prefix table, and BGP route withdraw messages are sent to the peer routing systems for routes having prefixes listed in the prefix table but not identified in the backup routing database.

In another embodiment, the present invention provides a routing system. The routing system comprises a primary routing processor, a backup routing processor, and a plurality of line interfaces to route communications in accordance with a routing database managed by the routing processors. In response to detection of failure of the primary routing processor, the backup routing processor generates a backup routing database from routes received from peer routing systems, compares prefixes of routes in the backup routing database with prefixes in a prefix table, and sends route withdraw messages to the peer routing systems for routes having prefixes listed in the prefix table and not identified in the backup routing database. Upon detection of a failure of the primary routing processor, the backup routing processor is instructed to perform a failover process to enable the performance of routing management by the backup processor. The failover process includes soliciting the routes from peer routing systems. The backup routing processor may generate the backup routing database by removing redundant routes by implementing a best-path algorithm to eliminate redundant routes received from peer routing systems.

When a route update message is received from one of the peer routing systems indicating a new route handled by that peer routing system, the new route may be added to the current routing database. As part of checkpointing, the prefix table may be updated with a prefix of the new route when the prefix is not already listed in the prefix table.

BRIEF DESCRIPTION OF THE DRAWINGS

The appended claims are directed to some of the various embodiments of the present invention. However, the detailed description presents a more complete understanding of the present invention when considered in connection with the figures, wherein like reference numbers refer to similar items throughout the figures and:

DETAILED DESCRIPTION

Figure 1:
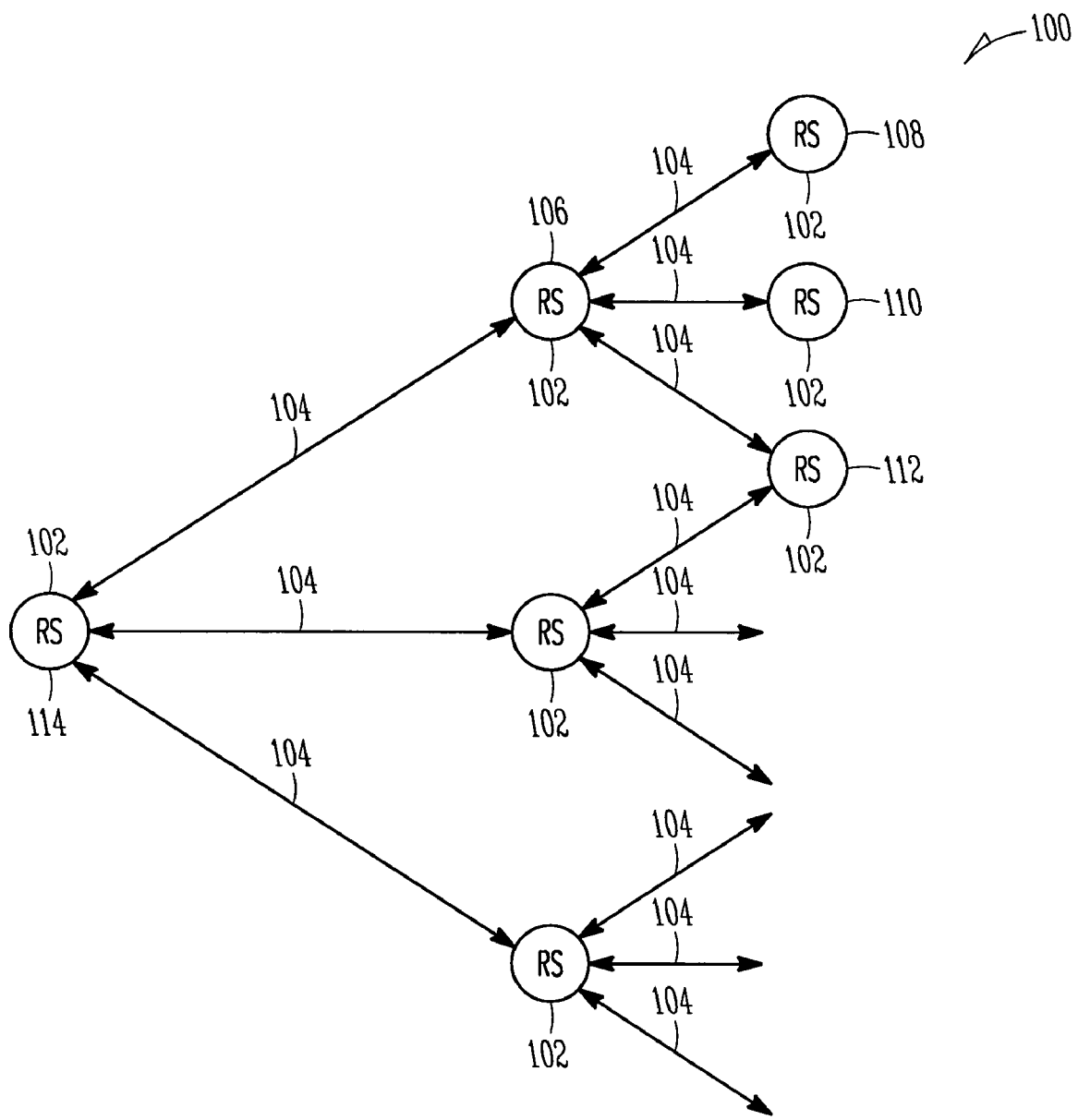
FIG. 1 illustrates a network of routing systems in accordance with an embodiment of the present invention.

The following description and the drawings illustrate specific embodiments of the invention sufficiently to enable those skilled in the art to practice it. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. The scope of the invention encompasses the full ambit of the claims and all available equivalents.

In various embodiments, the present invention provides an improved routing system and method of routing. In embodiments, the present invention also provides a routing system and method that reduces the amount of checkpointing required during normal routing operations. In other embodiments, the present invention provides a routing system and method that re-synchronizes with peer routing systems after failover of a primary routing processor. In other embodiments, the present invention also provides a routing system and method that supports a Border Gateway Protocol (BGP) and re-synchronizes with peer routing systems after failover of a primary routing processor without excessive checkpointing. In other embodiments, the present invention also provides a routing system and method that re-synchronizes with peer routing systems after failover of a primary routing processor without requiring peer systems to update their software. In various embodiments, the present invention may support the BGP for routing IPv4 protocol packets, IPv6 protocol packets, connectionless network service (CLNS) packets, as well as packets configured in accordance with other protocols.

Embodiments of the present invention provide for transparent routing system failover by checkpointing route prefixes during normal operation in a route prefix table. When new routes are added to a routing database, the route prefix table is updated when a prefix for the new route is not in the prefix table. After failure of a primary routing processor, routing with peer routing systems is synchronized through the use of this prefix table. Upon the detection of a failure, a backup routing processor solicits routes from peer routing systems in response to the failure, and generates a backup routing database from the routes received from peer routing systems. The backup routing processor then sends route announcement messages to the peer routing systems for routes in the backup routing database. The backup routing processor also compares prefixes of routes in the backup routing database with prefixes in the prefix table, and sends route withdraw messages to the peer routing systems for routes having prefixes listed in the prefix table and not identified in the backup routing database.

In some embodiments of the present invention, a Border Gateway Protocol (BGP) may be supported. An example of the BGP is described in the document by the Network Working Group, Request for Comments: 1771, referred to as RFC 1771, entitled "A Border Gateway Protocol 4 (BGP-4)" dated March 1995, edited by Y. Rekhter and T. Li. This revision of RFC 1771 and any later versions and revisions are incorporated herein by reference.

FIG. 1 illustrates a network of routing systems in accordance with an embodiment of the present invention. Network 100 includes a plurality of routing systems (RS) 102 that communicate with peer routing systems over links 104. Peer routing systems refer to routing systems directly accessible to a particular routing system without requiring routing through an interim routing system. For example, the peer routing systems of routing system 106 may include routing systems 108, 110, 112 and 114. Peer routing systems also include routing systems that may not be directly coupled by a link but communicate as though they were directly coupled. FIG. 1 may illustrate only a small portion of network 100 which may comprise many tens of thousands or more or routing systems 102. Links 104 may comprise any type of communication link that provides for the communication of packetized data between routing systems. Links 104 may include any type of communication link, including wireless links, optical links, wired links and other links not enumerated herein.

In one embodiment, at least some of routing systems 102 may perform packet forwarding in accordance with the BGP. In accordance with this embodiment, routing tables are initially exchanged between the nodes (e.g., systems 102) and routing may be performed by each node in accordance with its locally stored routing database. Incremental updates are sent between nodes to update their routing databases. Each routing system may retain a routing database that includes current routing information from its peer systems for the duration of the connection. Keep-alive messages may be sent periodically to help ensure the liveliness of the connection.

Figures 2, 3:
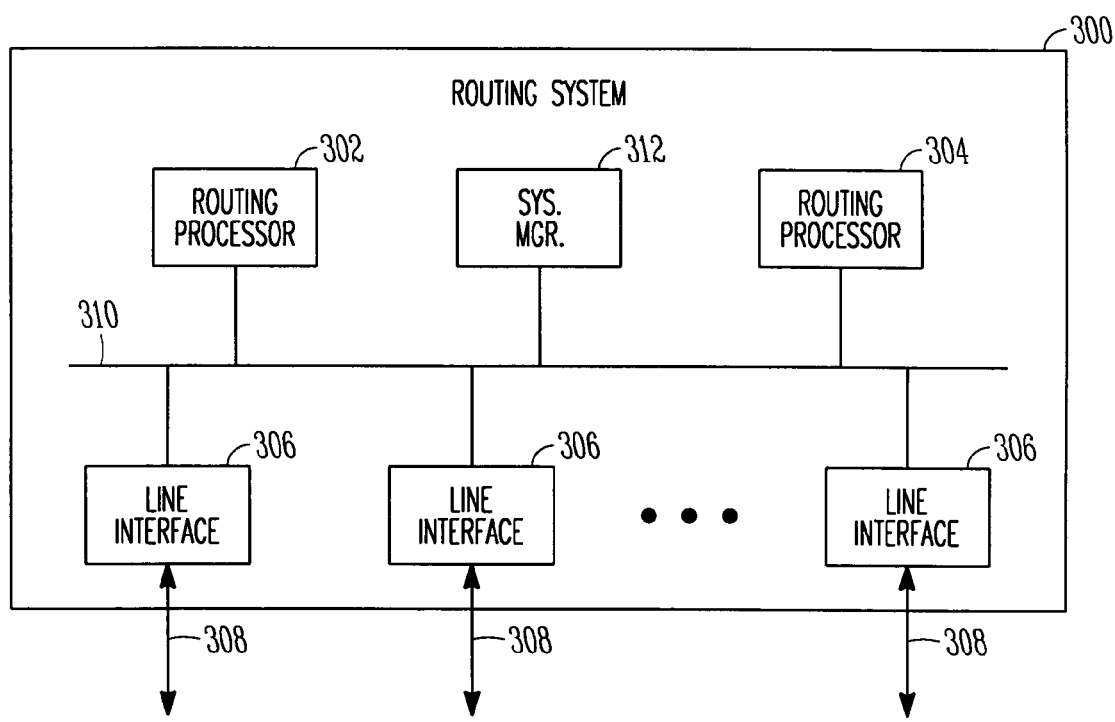
FIG. 2 is an example of a routing database in accordance with an embodiment of the present invention.
FIG. 3 is a functional block diagram of a routing system in accordance with an embodiment of the present invention.

FIG. 2 is an example of a portion of a routing database in accordance with an embodiment of the present invention. Routing database 200 may be generated by a routing system from routing information received from peer nodes. The routing information received from peer nodes may include routing tables or may be in the form or routing update messages. As used herein, the term "routing database" may include any data structure used for routing. In some embodiments, including the BGP embodiments, the term "routing database" may refer to a routing information base (RIB). In the BGP embodiments, a backup local RIB is generated and is used to generate a backup forwarding information base (FIB) in which the data may be downloaded to line cards.

Routing database 200 may include prefix column 202 which may include a prefix such as an IP address prefix. An example IP address prefix is "192.168.42/24" where "/24" may denote a number of bits in the prefix. This example IP prefix may be portion of an IP address. This example prefix, 192.168.42/23 would be a 23-bit prefix which includes within itself both 192.168.42/24 and 192.168.43/24 as well as all longer prefixes (i.e. 192.168.42.*/[25-32] and 192.168.43.*/[25-32]). Another way of writing 192.168.42/24 is with a "netmask" which indicates the significant bits. If represented that way it would 192.168.42.0 255.255.255.0, where the first dotted quad is the address and the second is the mask. For an IPv4 address, there may be up to 2^32 prefixes. Identical prefixes in column 202 may be associated with more than route or path for routing data. Column 204 identifies a next hop address for a particular route. The next hop address may be the IP address of a border router that should be used as the next hop to a destination identified in an update message.

Entries within routing database 200 may also include column 206 which may identify an autonomous system (AS) path attribute for each route. In one embodiment supporting BGP-4, a set of reachable destinations may be expressed by a single IP prefix. Routes having the same prefix in column 202 may have a different AS path identified in column 206. Routing database 200 may be distinguished from each other by having either a different AS path identified in column 206 or different path attributes identified in column 208. Path attributes, may, for example, identify the peer system that has sent a particular route. In some embodiments (e.g., some non-BGP embodiments), routing database 200 may include a greater or lesser number of columns for each route than those indicated.

A routing system, such as routing system 102 (FIG. 1) may generate routing database 200 from routing information (e.g., update messages), which may be received from peer routing systems. An update message may identify routes supported by a peer routing system and may include a prefix and an AS path. An update message may also identify routes that a peer routing system no longer supports. In this case, a route may be indicated in a withdrawn routes field of an update message received from the peer system.

In one embodiment, update messages may be used to transfer routing information between peer routing systems. The information in an update packet can be used to construct a graph describing the relationships of the various autonomous systems. By applying rules, routing information loops and some other anomalies may be detected and removed from inter-AS routing. In this embodiment, an update message may advertise one or more feasible routes to a peer, or withdraw multiple unfeasible routes from service. An update message may also simultaneously advertise one or more feasible routes and withdraw multiple unfeasible routes from service. An update message may include a fixed-size header, and can optionally include the other fields, such as an unfeasible routes length field, a withdrawn routes field, a total path attribute length field, a path attributes field, and a network layer reachability information field.

The unfeasible routes length field may comprise a two-octets unsigned integer indicating the total length of the withdrawn routes field in octets. Its value may also allow the length of the network layer reachability information field to be determined. A value of zero may indicate that no routes are being withdrawn from service, and that the withdrawn routes field is not present in this update message. The withdrawn routes field may be a variable length field that contains a list of IP address prefixes for the routes that are being withdrawn from service. Each IP address prefix may be encoded as a 2-tuple of the form <length, prefix>. The length field may indicate the length in bits of the IP address prefix. A length of zero may indicate a prefix that matches all IP addresses. The prefix field may contain IP address prefixes followed by enough trailing bits to make the end of the field fall on an octet boundary. The total path attribute length may be a two-octet unsigned integer used to indicate the total length of the path attributes field in octets. A value of zero may indicate that no network layer reachability information field is present in this update message. The path attributes may be a variable length sequence of path attributes. Path attributes may include an origin that defines the origin of the path information. The AS path is an attribute that may be comprised of a sequence of AS path segments. Each AS path segment may be represented by a triple <path segment type, path segment length, path segment value>. Although embodiments of the present invention are described herein for the support of the BGP for IPv4 packets, in other embodiments, the present invention may support the BGP for routing IPv6 protocol packets, connectionless network service (CLNS) packets, as well as packets configured in accordance with other protocols. In one embodiment, update messages need only identify a route being withdrawn by the prefix.

Figure 4:
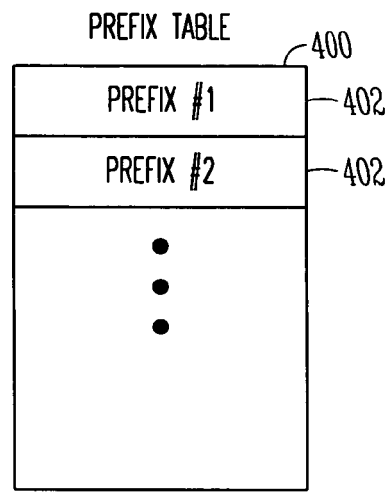
FIG. 4 is an example of a prefix table in accordance with an embodiment of the present invention.

FIG. 3 is a functional block diagram of a routing system in accordance with an embodiment of the present invention. Routing system 300 may perform routing between peer routing systems as described herein. Routing system 300 may be suitable for use as one of routing systems 102 (FIG. 1) although other routing systems are also suitable. Routing system 300 may include primary routing processor 302, backup routing processor 304 and a plurality of line interfaces 306 to route communications received over links 308 in accordance with a routing database managed by the routing processors. Routing database 200 (FIG. 2) is an example of a suitable routing database for use by routing processors. Routing system 300 may provide for a substantially transparent failover by checkpointing route prefixes during normal operation by maintaining a route prefix table. An example of a suitable prefix table is illustrated in FIG. 4. In response to detection of a failure of primary routing processor 302, backup routing processor 304 generates a backup (e.g., regenerated) routing database from routes received from peer routing systems. Backup routing processor 304 may also send route advertisement messages to peer routing systems for routes identified in the backup routing database. Backup routing processor 304 may also compare prefixes of routes in the backup routing database with prefixes in a prefix table, and may send route withdraw messages to the peer routing systems for routes having prefixes listed in the prefix table and not identified in the backup routing database. In one BGP embodiment, a route advertisement message and a route withdraw message may both be considered forms of a BGP update message.

In one embodiment, upon detection of a failure of primary routing processor 302, backup routing processor 304 may be instructed to perform a failover process to enable the performance of routing management by backup processor 304. The failover process may include soliciting the routes from peer routing systems. Backup routing processor 304 may generate a backup routing database by removing redundant routes by implementing a best-path algorithm to eliminate redundant routes received from peer routing systems. Each routing system 302, 304 may include at least a processing element and associated memory. In the BGP embodiments, a backup local RIB is generated and is used to generate a backup forwarding information base (FIB) in which the data may be downloaded to line cards.

During normal operations, the currently active routing processor (either routing processor 302 or 304) may receive a route update message from one of the peer routing systems indicating a new route handled by the peer routing system.

The currently active routing processor may add the new route to a current routing database. The currently active routing processor may also checkpoint the prefix by updating the prefix table with a prefix of the new route when the prefix is not listed in the prefix table. The prefix table may be stored in a memory of the backup routing processing system.

In one embodiment, when the currently active routing processor receives a route update message from one of the peer routing systems that identifies a route to withdraw, the route update message may indicate a withdrawn route no longer handled by that peer routing system. The currently active routing processor may remove the withdrawn route from the current routing database. The currently active routing processor may also removes a prefix of the withdrawn route from the prefix table when the current routing database includes no routes with that particular prefix.

Line interfaces 306 route packets in accordance with the routing database, which may be provided by the currently active routing processor over communication path 310, which may be a bus. In one embodiment, after the routing database is updated by the active routing processor, the update may be provided to line interfaces 306. During failover operations, line interfaces 306 may continue to perform packet forwarding in accordance with the most recently received routing database until the regenerated routing database is received. In one embodiment, system manager 312 may be used to detect failure of primary routing processor 302 in many different ways including by monitoring signals such as heartbeat messages from the routing processor.

Although system 300 is illustrated as having several separate functional elements, one or more of the functional elements may be combined and may be implemented by combinations of software configured elements, such as processors including digital signal processors (DSPs), and/or other hardware elements. Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, computing device includes one or more processing elements coupled with computer readable memory that may be volatile or non-volatile memory or a combination thereof. Moreover, as used herein, data refers to one or more storage data elements, which can include portions of files, a single file, a file extent, a database, a storage device partition, a volume, sets of volumes and the like. The data need not reside on a single storage device and may span multiple storage devices.

FIG. 4 is an example of a prefix table in accordance with an embodiment of the present invention. Prefix table 400 may include a list of IP address prefixes 402 for routes supported by a routing system, such as routing system 300 (FIG. 3). Prefix table 400 is managed by the primary routing processor and is accessible by a backup routing processor at least after a failure of the primary routing processor. In one embodiment, prefixes need only be added to table 400 when a new route is added to the routing database that has prefix not already listed in the prefix table. In addition, prefixes may be removed from table 400 when a route is withdrawn from the routing database and no additional routes having the same prefix are included in the routing database. Accordingly, the use of a prefix table may significantly reduce the amount of checkpointing required for resynchronization with peer routing systems. A prefix is checkpointed to table 400 before the corresponding route(s) may be advertised to peer systems. On the other hand, routes do not necessarily have to be withdrawn before removing a corresponding prefix from table 400.

Figure 5:
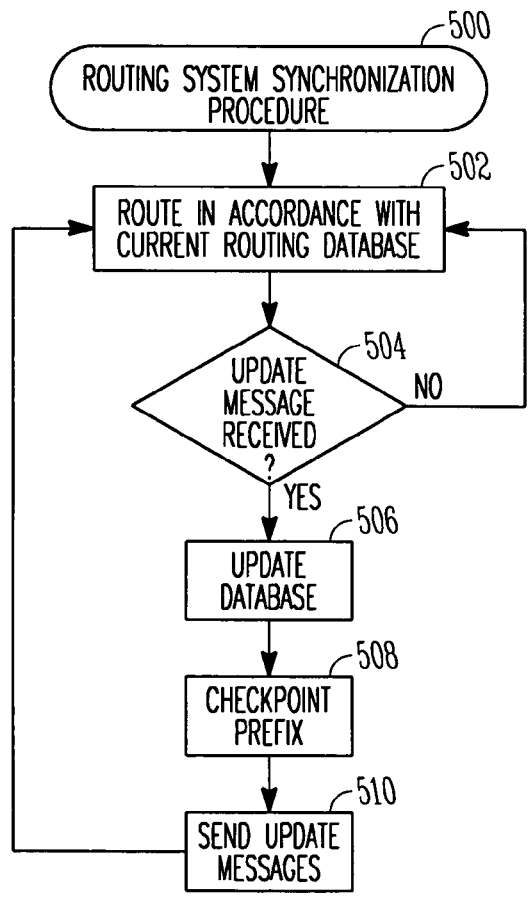
FIG. 5 is a flow chart of a routing system synchronization procedure in accordance with an embodiment of the present invention.

FIG. 5 is a flow chart of a routing system synchronization procedure in accordance with an embodiment of the present invention. Synchronization procedure 500 may be implemented by a routing system, such as system 300 FIG. 3 although other routing systems may also be suitable for implementing procedure 500. In general, procedure 500 may synchronize peer routing systems through the use of checkpointing, and may result in a substantially transparent failover. In one embodiment, the routing system performing procedure 500 may support a border gateway protocol, such as the BGP discussed above, although this is not a requirement, and may provide transparent BGP failover. In one embodiment, procedure 500 may be implemented in combination with a TCP session recovery technique.

Procedure 500 may be viewed as a procedure that is performed during normal operations that includes checkpointing and routing. After a failure, a recovery procedure, such as procedure 600 (FIG. 6) may be performed that includes reacquisition and redistribution of routes.

In operation 502, the routing system may route communications in accordance with one or more routing databases. In one embodiment, the routing system may include a plurality of line interfaces, such as interface cards for particular communication links. The line interfaces may store a current routing database, such as routing database 200 (FIG. 2) for use in routing communications. The current routing database may be provided by an active routing processor, which, among other things, manages the routing database.

In operation 504, a new route may be received from a peer routing system. In one embodiment, the new route may be received as part of a route update message, which may be in accordance with the BGP. When a new route is received, the active routing processor may update the current routing database in operation 506. When a new route is not received in operation 504, operation 502 may be repeated.

In operation 508, the new route is checkpointed. In one embodiment, operation 508 includes adding a prefix for the new route to a prefix table, which is accessible by a backup routing processor. The prefix table is preferably accessible to the backup routing processor at least after a failure of the primary routing processor. Prefix table 400 (FIG. 4) is an example of a suitable prefix table utilized by the routing system. The prefix for a particular route is added to the prefix table when the received route is for a prefix not previously represented in the prefix table. Since a routing database may include many alternate routes for the same prefix, a significant reduction in checkpointing may be achieved in comparison to conventional method which checkpoint each route. In one embodiment, only the prefix itself is checkpointed (e.g., five bytes or fewer for an IPv4 route).

In one embodiment, when a route is added to the current routing database in operation 508, the active routing processor may provide line interfaces, such as line interfaces 306 (FIG. 3), with updated routing information. In addition, when a new route is added to the current routing database, peer routing systems may be informed that the routing system will be performing routing in accordance with the received route. In a BGP embodiment as well as in some other embodiments, checkpointing is performed before a corresponding route is advertised to peers. Procedure 500 may also include the removal of routes in response to route update messages to withdrawing one or more routes received from peer routing systems. In this case, operation 508 may include the removal of prefixes from the prefix table when no routes are supported for a particular prefix.

In operation 510, update messages may be sent to peer routing systems. The update messages may inform peer routing systems of routes that are now being handled by the present routing system in addition to route no long being handled by the present routing system. In a BGP embodiment, operation 510 may include sending route update messages in accordance with the BGP.

During the performance of procedure 500, signals from the currently active (i.e., primary) routing processor may be monitored to detect a failure. For example, heartbeat messages from the active routing processor may be monitored to detect a failure. A failure may be detected at any point during the performance of procedure 500. When a failure of the currently active routing processor is detected, a recovery procedure is initiated in which a backup processor solicits routes from peer routing systems to generate a backup routing database. When failure of the currently active routing processor is not detected, operations 502 through 510 are repeated and the routing system may continue its normal operations including routing packets and checkpointing prefixes of new routes as described above.

Although the individual operations of procedure 500 are illustrated and described as separate operations, one or more of the individual operations may be performed concurrently and nothing requires that the operations be performed in the order illustrated.

Figure 6:
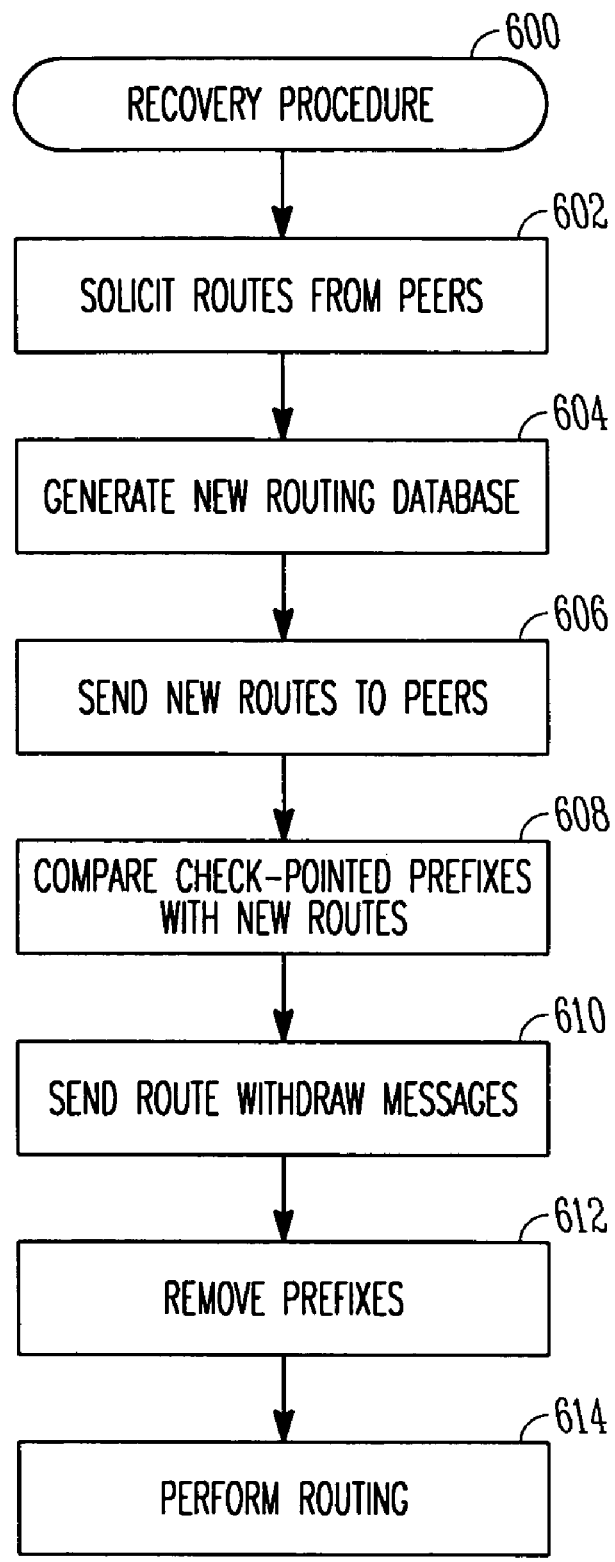
FIG. 6 is a flow chart of a recovery procedure in accordance with an embodiment of the present invention.

FIG. 6 is a flow chart of a recovery procedure in accordance with an embodiment of the present invention. Recovery procedure 600 may be suitable for use when a failure of the currently active (i.e., primary) routing processor is detected. Procedure 600 may be viewed as a failover process that enables a backup processor to perform routing management. Procedure 600 may be suitable for use when a failure is detected during the performance of procedure 500 (FIG. 5). Among other things, during the performance of procedure 600, a backup processor solicits routes from peer routing systems to generate a new routing database. In operation 602, the backup routing processor solicits routes from peer routing systems, and in a BGP embodiment, may send route refresh/request messages to the peer systems. In response to the request for routes, the backup routing processor may receive the peer's routes from the peer systems, which may be received as part of route update messages. Operation 602 may also include determining when all or enough of peer routes have been received, which may be implemented through a heuristic (e.g., receiving a keep-alive message or an empty update message). A timeout may also be used in the event the keep-alive or update messages are not received from a particular peer within a predetermined amount of time in response to the solicitation for routes.

In operation 604, a new routing database may be generated from the routes received from the peer routing systems. Redundant routes received from the peer routing systems may be removed from the database. In one embodiment, operation 604 may implement a best-path algorithm to eliminate routes having redundant prefixes received from the peer routing systems. In BGP embodiments, operation 604 may use the backup local RIB to generate a backup forwarding information base (FIB). Other methods of generating a routing database may also be suitable for various embodiments.

In operation 606, the new routes are sent (e.g., advertised) to the peer routing systems. In accordance with a BGP embodiment, the new routes are sent as part of BGP update messages. This update may inform peer systems which routes are supported by the routing system sending the new routes. In operation 608, the prefixes checkpointed in the prefix table are compared with prefixes of routes in the new routing database generated in operation 604. When operation 608 identifies a prefix in the prefix table not associated with any route in the new routing database, operation 610 may send a withdraw message to peer routing systems requesting the peer routing systems withdraw routes with this prefix. Operation 610 withdraws routes that were formerly advertised as being handled by the failed routing processor and the routes are no longer in the routing database. In one embodiment, a BGP update message (indicating to withdraw a prefix) may be sent for each prefix present in the prefix table that is not present in the new routing database (i.e., the recovered database). Upon the completion of operation 610, peer routing systems' states should be synchronized with the present routing system's state.

In operation 612, the prefix table maintained by the backup routing processor may be updated in which the prefixes identified in operation 610 may be removed. The backup routing processor may now be viewed as the primary or active routing processor and may perform operation 614. In operation 614, the now active routing processor may perform routing and route synchronization utilizing the new (i.e., recovered) routing database and checkpointed prefixes, for example, as described by procedure 500 (FIG. 5). In one embodiment, the failed routing processor may, for example, be replaced, repaired, or returned to service (e.g., restarted). It may then serve as a backup routing processor.

Although the individual operations of procedure 600 are illustrated and described as separate operations, one or more of the individual operations may be performed concurrently and nothing requires that the operations be performed in the order illustrated. In some embodiments, however, the addition of prefixes to the prefix table (i.e., the checkpoint) should be completed before peer routing systems are informed of routes corresponding with those prefixes.

In several other embodiments, the present invention provides an article comprising a storage medium having stored thereon instructions that when executed by a digital computing platform, result in soliciting routes from peer routing systems in response to the failure, generating a backup routing database from the routes received from peer routing systems, comparing prefixes of routes in the backup routing database with prefixes in a prefix table, and sending route withdraw messages to the peer routing systems for routes having prefixes listed in the prefix table and not identified in the backup routing database. The article, for example, may be a computer disc (e.g., magnetic or CD) or computer memory and the storage medium may be any computer readable medium including a magnetic or optical medium suitable for storing digital information.

Thus, a system and method for switching routing management to a backup routing processor upon failure of a primary routing processor has been described. The system and method may provide for substantially transparent failover through the use of checkpointed route prefixes.

The foregoing description of specific embodiments reveals the general nature of the invention sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the invention embraces all such alternatives, modifications, equivalents and variations as fall within the spirit and scope of the appended claims.

What is claimed is:

1. A method of switching routing management to a backup routing processor upon failure of a primary routing processor, the method comprising:
generating a backup routing database from routes received from peer routing systems requested in response to the failure;
comparing prefixes of routes in the backup routing database with prefixes in a prefix table; and
sending route withdraw messages to the peer routing systems for routes having prefixes listed in the prefix table and not identified in the backup routing database,
wherein the prefix table includes prefixes of routes supported by the primary routing processor prior to the failure.

2. The method of claim 1 further comprising:
soliciting routes from the peer routing systems in response to the failure; and
sending route announcement messages to the peer routing systems for the routes identified in the backup routing table.

3. The method of claim 2 wherein upon detection of a failure of the primary routing processor, soliciting routes comprises:
sending route refresh messages to the peer routing systems; and
receiving routes from the peer routing systems in response to the route refresh messages,
wherein the route refresh messages request routes supported by the peer routing systems.

4. The method of claim 1 wherein prior to detection of the failure, the primary routing processor utilizes an original routing database for performing routing, and the primary routing processor updates the prefix table to list prefixes of routes from the original routing database, the prefix table being stored in a memory accessible to the backup routing processor at least after the failure of the primary routing processor.

5. The method of claim 4 further comprising:
receiving a route update message from at least one of the peer routing systems indicating a new route handled by the at least one peer routing system;
adding the new route to a current routing database; and
updating the prefix table with a prefix of the new route when the prefix is not listed in the prefix table.

6. The method of claim 4 further comprising:
receiving a route withdraw message from at least one of the peer routing systems, the route withdraw message indicating a withdrawn route no longer handled by the at least one peer routing system;
removing the withdrawn route from a current routing database; and
removing a prefix of the withdrawn route from the prefix table when the current routing database lists no routes with the prefix.

7. The method of claim 1 wherein upon detection of a failure of the primary routing processor, the backup routing processor is instructed to perform a failover process to enable performance of routing management by the backup processor, the failover process including sending route refresh messages to the peer routing systems, receiving the routes from the peer routing systems, generating the backup routing database from the received routes, comparing prefixes of routes in the backup routing database with prefixes in the prefix table, and sending route withdraw messages to the peer routing systems for routes having prefixes that are listed in the prefix table but not identified in the backup routing database.

8. The method of claim 1 wherein generating the backup routing database from the received routes comprises removing redundant routes received from the peer routing systems.

9. The method of claim 8 wherein removing redundant routes includes implementing a best-path algorithm to eliminate the redundant routes.

10. The method of claim 1 wherein a plurality of line interfaces route communications in accordance with an original routing database, the original routing database being replaced with the backup routing database after failure of the primary routing processor.

11. The method of claim 1 wherein the primary and backup routing processors are part of a routing system, and wherein in response to the route withdraw messages sent by the routing system, the peer routing systems remove routes from their current routing database associated with routes handled by the routing system.

12. The method of claim 11 the routing system utilizes a border gateway protocol (BGP) for routing, wherein route refresh messages and the route withdraw messages are in accordance with the BGP, and wherein after the peer routing system removes duplicate prefixes, the routing system is substantially synchronized with the peer routing systems.

13. A method of synchronizing a border gateway protocol (BGP) routing system with BGP peer routing systems after failure of a primary routing processor of the BGP routing system, wherein the primary processor utilizes an original routing database for performing routing and maintains a prefix table accessible to a backup routing processor listing prefixes of routes of the original routing database, the method, performed by the backup processor upon detection of a failure of the primary routing processor, comprising:
sending BGP route refresh messages to the BGP peer routing systems, the BGP route refresh messages requesting routes supported by the BGP peer routing systems;
receiving routes from the BGP peer routing systems in response to the BGP route refresh messages;
generating a backup routing database from the routes received from the BGP peer routing systems;
comparing prefixes of routes in the backup routing database with prefixes in the prefix table; and
sending BGP route withdraw messages to the BGP peer routing systems for routes having prefixes listed in the prefix table but not identified in the backup routing database.

14. The method of claim 13 wherein generating the backup routing database from the received routes comprises removing redundant routes received from the BGP peer routing systems by implementing a best-path algorithm to eliminate the redundant routes received from the BGP peer routing systems, and
wherein the method further comprises:
routing, with a plurality of line interfaces, communications in accordance with the original routing database;

replacing the original routing database in the plurality of line interfaces with the backup routing database after failure of the primary routing processor; and routing, with the plurality of line interfaces, communications in accordance with the backup routing database.

15. The method of claim 14 wherein the primary and backup routing processors are part of the BGP routing system, and wherein in response to the route withdraw messages sent by the BGP routing system, the BGP peer routing systems remove routes having the same prefixes from their current routing database associated with routes handled by the BGP routing system.

16. The method of claim 14 further comprising:
receiving a BGP route update message from one of the BGP peer routing systems indicating a new route handled by the one BGP peer routing system;
adding the new route to a current routing database;
updating the prefix table with a prefix of the new route when the prefix is not listed in the prefix table;
receiving a BGP route withdraw message from another one of the BGP peer routing systems, the BGP route withdraw message indicating a withdrawn route no longer handled by the another BGP peer routing system;
removing the withdrawn route from the current routing database; and
removing a prefix of the withdrawn route from the prefix table when the current routing database lists no routes associated with the prefix.

17. A routing system comprising:
a primary routing processor;
a backup routing processor; and
a plurality of line interfaces to route communications in accordance with a routing database managed by the routing processors,
wherein in response to detection of failure of the primary routing processor, the backup routing processor generates a backup routing database from routes received from peer routing systems, compares prefixes of routes in the backup routing database with prefixes in a prefix table, and sends route withdraw messages to the peer routing systems for routes having prefixes listed in the prefix table and not identified in the backup routing database.

18. The system of claim 17 wherein upon detection of a failure of the primary routing processor, the backup routing processor is instructed to perform a failover process to enable the performance of routing management by the backup processor, the failover process including soliciting the routes from the peer routing systems,
and wherein the backup routing processor generates the backup routing database by removing redundant routes by implementing a best-path algorithm to eliminate redundant routes received from the peer routing systems.

19. The system of claim 17 wherein a currently active routing processor receives a route update message from one of the peer routing systems indicating a new route handled by the one peer routing system, adds the new route to a current routing database, and updates the prefix table with a prefix of the new route when the prefix is not listed in the prefix table, the currently active routing processor being the primary processor prior to the failure, the currently active processor being the backup processor after the failure.

20. The system of claim 19 wherein the currently active routing processor receives a route withdraw message from one of the peer routing systems, the route withdraw message indicating a withdrawn route no longer handled by the one peer routing system, removes the withdrawn route from a current routing database, and removes a prefix of the withdrawn route from the prefix table when the current routing database lists no routes with the prefix.

21. An article comprising a computer-readable storage medium having stored thereon instructions that, when executed by a digital computing platform, perform the steps comprising:
soliciting routes from peer routing systems in response to a failure;
generating a backup routing database from the routes received from the peer routing systems;
comparing prefixes of routes in the backup routing database with prefixes in a prefix table; and
sending route withdraw messages to the peer routing systems for routes having prefixes listed in the prefix table and not identified in the backup routing database.

22. The article of claim 21 wherein the instructions, when further executed by the digital computing platform, perform the steps comprising:
sending update messages to the peer routing systems to indicate the routes identified in the backup routing table,
wherein prior to detection of the failure, a primary routing processor utilizes an original routing database for performing routing, and the primary routing processor updates the prefix table to list prefixes of routes from the original routing database, the prefix table being stored in a memory accessible to a backup routing processor.

23. The article of claim 22 wherein the instructions, when further executed by the digital computing platform, perform the steps comprising:
receiving a route update message from one of the peer routing systems indicating a new route handled by the one peer routing system;
adding the new route to a current routing database; and
updating the prefix table with a prefix of the new route when the prefix is not listed in the prefix table.

24. An apparatus for switching routing management to a backup routing processor upon failure of a primary routing processor, the apparatus comprising:
means for generating a backup routing database from routes received from peer routing systems requested in response to the failure;
means for comparing prefixes of routes in the backup routing database with prefixes in a prefix table; and
means for sending route withdraw messages to the peer routing systems for routes having prefixes listed in the prefix table and not identified in the backup routing database,
wherein the prefix table includes prefixes of routes supported by the primary routing processor prior to the failure.

25. The apparatus of claim 24 further comprising:
means for soliciting routes from the peer routing systems in response to the failure; and
means for sending route announcement messages to the peer routing systems for the routes identified in the backup routing table.

26. The apparatus of claim 25 wherein the means for soliciting routes comprises:
means for sending route refresh messages to the peer routing systems; and
means for receiving routes from the peer routing systems in response to the route refresh messages, wherein the route refresh messages request routes supported by the peer routing systems.

27. The apparatus of claim 24 wherein prior to detection of the failure, the primary routing processor includes means for utilizing an original routing database for performing routing, and the primary routing processor includes means for updating the prefix table to list prefixes of routes from the original routing database, the prefix table being stored in a memory accessible to the backup routing processor at least after the failure of the primary routing processor.

28. The apparatus of claim 27 further comprising:
means for receiving a route update message from at least one of the peer routing systems indicating a new route handled by the at least one peer routing system;
means for adding the new route to a current routing database; and
means for updating the prefix table with a prefix of the new route when the prefix is not listed in the prefix table.

29. The apparatus of claim 27 further comprising:
means for receiving a route withdraw message from at least one of the peer routing systems, the route withdraw message indicating a withdrawn route no longer handled by the at least one peer routing system;
means for removing the withdrawn route from a current routing database; and means for removing a prefix of the withdrawn route from the prefix table when the current routing database lists no routes with the prefix.

30. The apparatus of claim 24 wherein upon detection of a failure of the primary routing processor, the backup routing processor includes means for performing a failover process to enable the performance of routing management by the backup processor, the means for performing the failover process including means for sending route refresh messages to the peer routing systems, means for receiving the routes from the peer routing systems, means for generating the backup routing database from the received routes, means for comparing prefixes of routes in the backup routing database with prefixes in the prefix table, and means for sending route withdraw messages to the peer routing systems for routes having prefixes that are listed in the prefix table but not identified in the backup routing database.

31. The apparatus of claim 24 wherein the means for generating the backup routing database from the received routes comprises means for removing redundant routes received from the peer routing systems.

32. The apparatus of claim 31 wherein the means for removing redundant routes includes means for implementing a best-path algorithm to eliminate the redundant routes.

33. The apparatus of claim 24 wherein a plurality of line interfaces include means for routing communications in accordance with an original routing database, the original routing database being replaced with the backup routing database after failure of the primary routing processor.

34. The apparatus of claim 24 wherein the primary and backup routing processors are part of a routing system, and wherein the peer routing systems include means for removing routes from their current routing database associated with routes handled by the routing system in response to the route withdraw messages sent by the routing system.

35. The apparatus of claim 34 wherein the routing system includes means for utilizing a border gateway protocol (BGP) for routing, wherein route refresh messages and the route withdraw messages are in accordance with the BGP, and wherein after the peer routing system removes duplicate prefixes, the routing system is substantially synchronized with the peer routing systems.

* * * * *